3,285,807
METHOD FOR CONTROLLING PLANT FUNGI WITH ZINC-MANGANESE 1,2-PROPYLENE-BIS-DI-THIOCARBAMATE MIXED SALT
Hellmuth Lehmann, Wuppertal-Elberfeld, Ferdinand Grewe, Burscheid, and Walter Lautenschlager, Wuppertal-Vohwinkel, Germany, assignors to Farbenfabriken Bayer Aktiengesellschaft, Leverkusen, Germany, a German corporation
No Drawing. Filed Feb. 6, 1963, Ser. No. 256,511
Claims priority, application Germany, Feb. 7, 1962, F 35,960
7 Claims. (Cl. 167—22)

The present invention relates to and has as its objects new fungicidal agents consisting of or containing mixtures of different metal salts of propylene-bis-di-thiocarbamic acid, as well as methods for controlling fungus growth on plants.

More specifically this invention relates to fungicidal compositions consisting of or containing mixtures of the propylene-bis-dithiocarbamic acid salts of bi- and tri-valent metals in Groups I, II and VIII of the Periodic System, especially mixtures of zinc, manganous, nickel, cobalt, cupric, cadmium, ferrous or ferric propylene-bis-dithiocarbamate.

Metals salts of alkylene-bis-dithiocarbamic acids have been known for some time from the literature. Thus, for instance, U. S. patent specification No. 2,317,765 describes the cupric, zinc, ferrous, and cadmium ethylene-bis-dithiocarbamates and Austrian patent specification No. 193,891 the corresponding heavy metal salts of propylene-bis-dithiocarbamic acid.

The stated compounds are prepared by a method known in principle, by reacting an alkylene-diamine with carbon disulphide in the presence of a strong base, preferably an alkali metal, alkaline earth metal, or ammonium hydroxide in aqueous solution, and by reacting the resultant alkylene-bis-dithiocarbamate with an aqueuos solution of the appropriate heavy metal salt when the respective heavy metal alkylene-bis-dithiocarbamate usually separates from the reaction mixture in the form of a slightly soluble precipitate and is isolated by filtering. According to the statements in the cited patent specifications, ethylene-, propylene-, tetramethylene-, and p-phenylene-diamine as well as piperazine are, inter alia, suitable starting materials for this process.

Moreover, the good fungicidal activity of the alkylene-bis-dithiocarbamates has also been known for a long time (cf. the two above patent specifications). By virtue of these properties, the stated compounds constitute valuable agents for fungus control.

Finally, published South African patent application No. 605,125, concerns compounds with fungicidals activity based on those zinc or calcium ethylene-bis-dithiocarbamates whose ethylene bridge has been substituted once or twice by alkyl radicals. In this respect, the zinc salts of methyl-, ethyl-, and dimethyl-ethylene-bis-dithiocarbamic acid are described as being particularly suitable.

It has now been found that mixed metal salts of propylene-bis-dithiocarbamic acid are not only characterised by excellent fungicidal properties but that when they are applied against fungi capable of causing damage to plants their activity clearly surpasses that of the individual components. Moreover, the mixed salts according to the invention are also markedly superior to the mixtures of the corresponding ethylene-bis-dithiocarbamates in respect of their activity. Thus, for instance, the fungicidal activity of the zinc-manganese mixed salt of propylene-bis-dithiocarbamic acid is distinctly better than that of a mixture of zinc and manganese ethylene-bis-dithiocarbamate salts.

Furthermore, it has been found that these salts which are, in part, quite unstable ($Fe^{++}$, Mn), are largely stabilised in the preferred form to such an extent that the latter are very well suited for practical application in plant protection. This stabilising effect as well as the superior activity of the mixed salts according to the invention is unexpected and could not have been foreseen.

Mixed salts of the propylene-bis-dithiocarbamic acid of bi and tri-valent metals in Groups I, II and VIII of the Periodic System have proved particularly suitable for the purpose of the present invention. By way of example, mention may be made of the mixed salts from zinc, manganese, nickel, cobalt, cupric, cadmium, ferrous, and ferric propylene-bis-dithiocarbamate.

The preparation of the mixed salts to be employed according to the invention is carried out according to methods known in principle, i.e. by the simultaneous precipitation of the propylene-bis-dithiocarbamate obtained in the normal manner from 1,2-propylene-diamine, carbon disulphide, and a strong base with a mixture of the solutions of the respective zinc and manganese salts wherein the proportions in the mixture can be widely varied. The process can be described briefly by reference to a representative example:

255 g. of 1,2-propylene-diamine are dissolved in 1.87 litres of water, 550 g. of carbon disulphide are added dropwise to this solution, and the reaction mixture is subsequently treated with 555 g. of 46% sodium hydroxide solution.

The resultant solution of sodium propylene-bis-dithiocarbamate is precipitated with a manganese-inc sulphate solution (proportions in the mixture 8:2). 705 g. of a mixed precipitate of mixed zinc-manganese propylene-bis-dithiocarbamate are obtained.

The fungicidal mixtures according to the invention develop an excellent activity towards all those fungi causing damage to plants against which the above mentioned known heavy metal salts of propylene-bis-dithiocarbamic acid have hitherto been applied. The preparations are particularly suitable for the control of *Phytophthora infestans, Cladosporium fulvum*, and *Alternaria solani* on tomatoes and potatoes. In addition, they can be successfully applied against *Peronospora (Plasmopara viticola)* on vines, *Venturia inaequalis* on stone fruit, and other disease causing fungi on various food plants. The application of the agents according to the invention is carried out by a method known in principle, i.e. preferably in conjunction with suitable solid or liquid extenders or diluents. Chalk, silica gel, talc, bentonites, vermiculites, and the like are predominantly suitable as solid inert materials for this purpose, whilst water is particularly employed as the diluent for the preparation of liquid compositions. Since the mixed salts to be employed according to the present invention are however largely insoluble in water, it is necessary or appropriate for the preparation of dilutions in water first to dissolve them in a solubilising assistant (for instance acetone, dimethylformamide) and then to dilute this preliminary mixture with water to the required concentration in the presence of a commercial non-ionogenic emulsifying agent and also optionally in conjunction with wetting and/or bonding agents and/or solid compounding assistants. It is possible to apply the mixtures according to the invention in conjunction with other fungicides and/or insecticides.

The following example illustrates the invention in detail:

EXAMPLE 1

Young tomato plants of the "Bonny best" variety are sprayed in the 4 to 5 leaf stage with aqueous emulsions or suspensions of the products specified below. The plants are dried off for 24 hours, they are then sprayed superficially with spore suspensions of *Phytophthora infestans*, and they are subsequently introduced into a moist chamber in which a relative air humidity of about 100% prevails. When the incubation period has elapsed, the fungus infection is estimated by evaluating the individual pinnules, classifying in grades from 0 (free from infection) to 5 (leaf infected throughout its entire area or destroyed), and the extent of the infection is expressed as the percentage of the infection in the untreated control plants (infection=100).

The following Tables 1 to 3 compare the effectiveness of the mixed salt from zinc and manganese propylene-bis-dithiocarbamate towards *Phytophthora infestans* with the activity of the corresponding heavy metal salts of ethylene-bis-dithiocarbamic acid at different mixture proportions and also with that of the individual components.

Fungicidal activity of mixed heavy metal salts of propylene-bis-dithiocarbamic acid in comparison with the corresponding mixtures of salts of ethylene-bis-dithiocarbamic acid.

*Test fungus.*—*Phytophthora infestans* on tomatoes

From the tabulated experimental results, it is evident that in respect of fungicidal activity the zinc-manganese mixed salt to be employed according to the invention is clearly superior to the corresponding mixture from zinc and manganese ethylene-bis-dithiocarbamate as well as to the separate zinc or manganese salts of ethylene- and propylene-bis-dithiocarbamic acids when applied against *Phytophthora infestans*.

TABLE 1

| Product | Mixture proportions | Overall concentration of active agent, as percent | Infection, as percent of the untreated control (=100) |
|---|---|---|---|
| Mixed salt from zinc propylene-bis-dithiocarbamate. and Manganese propylene-bis-dithiocarbamate. | 50:50 | 0.0125 / 0.0031 | 0 / 0.9 |
|  | 20:80 | 0.0125 / 0.0031 | 0 / 0.2 |
| Mixed salt from zinc ethylene-bis-dithiocarbamate. and Manganese ethylene-bis-dithiocarbamate | 50:50 | 0.0125 / 0.0031 | 0.9 / 22 |
|  | 20:80 | 0.0125 / 0.0031 | 0.9 / 9 |

TABLE 2

| Product | Mixture proportions | Overall concentration of active agent, as percent | Infection, as percent of the untreated control (=100) |
|---|---|---|---|
| Mixed salt from zinc propylene-bis-dithiocarbamate. and Manganese propylene-bis-dithiocarbamate. | 20:80 | 0.025 / 0.0062 | 0 / 0 |
| Zinc ethylene-bis-dithiocarbamate | | 0.025 / 0.0062 | 4 / 31 |
| Manganese ethylene-bis-dithiocarbamate | | 0.025 / 0.0062 | 0.5 / 11 |

TABLE 3

| Product | Mixture proportions | Overall concentration of active agent, as percent | Infection, as percent of the untreated control (=100) Experiment No. I | II |
|---|---|---|---|---|
| Mixed salt from zinc propylene-bis-dithiocarbamate. and Manganese propylene-bis-dithiocarbamate. | 50:50 | 0.025 / 0.0125 / 0.0062 / 0.0031 | --- / 0 / --- / 0.9 | --- / 0.6 / --- / 0.8 |
|  | 20:80 | 0.025 / 0.0125 / 0.0062 / 0.0031 | --- / 0 / --- / 0.2 | --- / --- / 0 / 3 |
| Zinc propylene-bis-dithiocarbamate | | 0.025 / 0.0125 / 0.0062 / 0.0031 | --- / 2 / --- / 11 | --- / --- / 13 / 23 |

We claim:

1. A method for controlling fungal infection of a plant, comprising contacting said plant with an active amount of a mixed zinc manganese salt of 1,2-propylene-bis-dithiocarbamic acid.

2. A method for controlling fungal infection according to claim 1 wherein the mixed salt is incorporated into an inert liquid and sprayed onto the plant.

3. A method for controlling fungal infection according to claim 1 wherein the mixed salt is sprayed onto the plant in the form of an aqueous emulsion.

4. A method for controlling fungal infection according to claim 1 wherein the mixed salt is optionally combined with a wetting agent and an extender and applied onto the plant as a dust.

5. A method for controlling fungal infection comprising applying to the plant being treated an active amount of the mixed salt of zinc/manganese propylene-bis-dithiocarbamate at a ratio of about 50:50 by weight of the metal ions.

6. A method of controlling fungal infection comprising applying to the plant being treated an active amount of a mixed salt of zinc/manganese propylene-bis-dithiocarbamate at a ratio of about 20:80 by weight of zinc to manganese ions.

7. A method for controlling fungus growth on plants which comprises contacting said plants with an active amount of fungicidal material consisting essentially of mixed zinc/manganese 1,2-propylene-bis-dithiocarbamate having proportions of 50–20:50–80 of zinc to manganese ions.

References Cited by the Examiner

UNITED STATES PATENTS

| 2,317,765 | 4/1943 | Hester | 167—22 |
| 3,082,229 | 3/1963 | Nash | 260—455 |
| 3,085,043 | 4/1963 | Beaver et al. | 167—22 |
| 3,167,471 | 1/1965 | Kovacs et al. | 167—13 |

FOREIGN PATENTS 193,891  12/1957  Austria.

JULIAN S. LEVITT, *Primary Examiner.*

GEORGE A. MENTIS, *Assistant Examiner.*